(12) United States Patent
Seo

(10) Patent No.: US 12,145,841 B2
(45) Date of Patent: Nov. 19, 2024

(54) METHOD FOR PRODUCING AMORPHOUS SULFIDE EXHIBITING EXCELLENT IONIC CONDUCTIVITY

(71) Applicant: BEILab corp., Ansan-si (KR)

(72) Inventor: Jihyun Seo, Suwon-si (KR)

(73) Assignee: BEILab corp., Ansan-si (KR)

( * ) Notice: Subject to any disclaimer, the term of this patent is extended or adjusted under 35 U.S.C. 154(b) by 0 days.

(21) Appl. No.: 18/558,541

(22) PCT Filed: Jun. 23, 2022

(86) PCT No.: PCT/KR2022/008949
§ 371 (c)(1),
(2) Date: Nov. 2, 2023

(87) PCT Pub. No.: WO2023/277449
PCT Pub. Date: Jan. 5, 2023

(65) Prior Publication Data
US 2024/0228280 A1   Jul. 11, 2024

(30) Foreign Application Priority Data
Jun. 28, 2021   (KR) .................. 10-2021-0083637

(51) Int. Cl.
*C01B 17/20*   (2006.01)
*C01B 17/22*   (2006.01)
(Continued)

(52) U.S. Cl.
CPC .............. *C01B 17/20* (2013.01); *C01B 17/22* (2013.01); *C01F 17/288* (2020.01); *C01G 3/12* (2013.01); *C01G 15/00* (2013.01); *C01G 17/00* (2013.01); *C01G 25/00* (2013.01); *H01M 10/0562* (2013.01); *C01P 2002/02* (2013.01);
(Continued)

(58) Field of Classification Search
CPC ....... C01B 17/20; C01B 17/22; C01F 17/288; C01G 3/12; C01G 15/00; C01G 17/00; C01G 25/00; H01M 10/0562; H01M 10/0525; H01M 2300/0068; C01P 2002/02; C01P 2006/40
See application file for complete search history.

(56) References Cited

FOREIGN PATENT DOCUMENTS

| JP | 2015-144062 A | 8/2015 |
|---|---|---|
| KR | 10-2013-0042580 A | 4/2013 |

(Continued)

OTHER PUBLICATIONS

Chen et al., Uniform High Ionic Conducting Lithium Sulfide Protection Layer for Stable Lithium Metal Anode, 2019, Adv. Energy Mater., 9, 1900858 (Year: 2019).*
(Continued)

*Primary Examiner* — Daniel S Gatewood
(74) *Attorney, Agent, or Firm* — NKL Law; Jae Youn Kim

(57) ABSTRACT

The present invention relates to a method for controlling the density of an amorphous sulfide and, more specifically, to a method for producing an amorphous sulfide having high ionic conductivity of lithium ions by controlling the interplanar distance between a metal atom and a chalcogen atom through the adjustment of the reaction temperature and rate, in carrying out a sulfidation reaction by supplying a sulfur source in a gas phase onto the surface of a metal or an alloy.

6 Claims, 2 Drawing Sheets

(51) Int. Cl.
  *C01F 17/288* (2020.01)
  *C01G 3/12* (2006.01)
  *C01G 15/00* (2006.01)
  *C01G 17/00* (2006.01)
  *C01G 25/00* (2006.01)
  *H01M 10/0525* (2010.01)
  *H01M 10/0562* (2010.01)

(52) U.S. Cl.
  CPC ..... *C01P 2006/40* (2013.01); *H01M 10/0525* (2013.01); *H01M 2300/0068* (2013.01)

(56) References Cited

FOREIGN PATENT DOCUMENTS

| | | |
|---|---|---|
| KR | 10-1421905 B1 | 7/2014 |
| KR | 10-2016-0105867 A | 9/2016 |
| KR | 10-2018-0066821 A | 6/2018 |

OTHER PUBLICATIONS

Chen, Hao, et al., Uniform high ionic conducting lithium sulfide protection layer for stable lithium metal anode. Advanced Energy Materials. Apr. 14, 2019, vol. 9, No. 22, p. 1900858 (inner pp. 1-8).

* cited by examiner

METHOD FOR PRODUCING AMORPHOUS SULFIDE EXHIBITING EXCELLENT IONIC CONDUCTIVITY

TECHNICAL FIELD

The present invention relates to a method of controlling the density of an amorphous sulfide, and more particularly to a method of adjusting the reaction temperature and rate in performing sulfidation reaction by gas-phase supplying a sulfur source to the surface of a metal or an alloy to control the interfacial distance between metal atoms and chalcogen atoms (e.g. sulfur atoms), thereby preparing an amorphous sulfide with high ionic conductivity of lithium ions.

BACKGROUND ART

With recent rapid spread of information-related devices or communication devices, such as a personal computer, a video camera, and a mobile phone, development of a battery used as a power supply therefor has become increasingly important. In the automotive industry, a high-output, high-capacity battery for electric or hybrid vehicles is also being developed. Currently, a lithium battery is attracting attention due to high energy density thereof, among various kinds of batteries.

A lithium secondary battery, which is a battery that is charged and discharged using redox reaction of lithium ions, includes a positive electrode and a negative electrode formed in the state in which an ion exchange membrane is interposed therebetween and an electrolytic solution.

In order to use the lithium secondary battery in a system that requires a higher-capacity battery, including an electric vehicle, there is a need to increase the capacity of a negative electrode active material and to improve output and lifespan characteristics.

A lithium battery currently on the market uses an electrolytic solution containing a flammable organic solvent, and therefore it is necessary to equip a safety device configured to inhibit the temperature rise in the event of short circuit or to improve the structure and materials for prevention of short circuit. A sulfide is used as an electrolyte material, and the sulfide electrolyte material has high Li ionic conductivity, which is useful for achieving high output of the battery.

Conventionally, the sulfide material was synthesized and prepared using various methods. In X-ray diffraction measurement using CuKa radiation, the 2θ angle peak is measured to define crystallinity; however, it is not possible to control the interfacial distance between metal atoms and chalcogen atoms using this method, whereby it is difficult to adjust ionic conductivity.

PRIOR ART DOCUMENT

Korean Registered Patent No. 1421905

DISCLOSURE

Technical Problem

It is an object of the present invention to provide a method of controlling the density of an amorphous sulfide to prepare an amorphous sulfide with high ionic conductivity of lithium ions. Specifically, it is an object of the present invention to provide a method of preparing an amorphous sulfide capable of controlling the density of the amorphous sulfide as low as possible in order to increase the ionic conductivity of lithium ions.

Technical Solution

The present invention provides a method of preparing an amorphous sulfide exhibiting excellent ionic conductivity, the method including:
  a first step of preparing a metal or an alloy including the metal; and
  a second step of gas-phase supplying a sulfur source to the surface of the metal or the alloy, wherein
  at least one of the temperature of sulfidation reaction between the sulfur source and the metal or the alloy and the flow rate or the flow speed of the sulfur source is adjusted in the second step.

The density of the amorphous sulfide may be adjusted by adjusting at least one of the temperature of sulfidation reaction between the sulfur source and the metal or the alloy and the flow rate or the flow speed of the sulfur source.

The reaction rate (the sulfidation reaction rate) may be controlled by adjusting the sulfidation reaction temperature, and the sulfidation reaction temperature may be room temperature (about 20° C. to 25° C.) to 300° C.

The reaction rate (the sulfidation reaction rate) may be controlled by adjusting the flow rate or the flow speed of the sulfur source.

The density of the amorphous sulfide may be adjusted by controlling the reaction rate. For example, the higher the reaction rate, the lower the density of the amorphous sulfide.

The alloy may be prepared in a reactor in the first step, and the sulfur source may be supplied into the reactor in the second step.

In the second step, the sulfur source may be continuously or pulse-like supplied.

The sulfur source may be hydrogen sulfide ($H_2S$), sulfur vapor (S vapor), methyl mercaptan, or a compound including a thiol group.

The metal or the alloy including the same may be at least one selected from the group consisting of lithium (Li), copper (Cu), lanthanum (La), germanium (Ge), indium (In), and zirconium (Zr).

In addition, the present invention provides a lithium-ion battery including a positive electrode, a negative electrode, and an electrolyte, wherein the electrolyte includes an amorphous compound prepared by the method described above.

Advantageous Effects

According to the present invention, the temperature and speed of sulfidation reaction are adjusted to control the interfacial distance of metal atoms and chalcogen atoms, whereby it is possible to prepare an amorphous sulfide with high ionic conductivity of lithium ions.

In addition, the amorphous sulfide prepared according to the method of the present invention may be included in an electrolyte of a lithium ion battery, whereby it is possible to improve ionic conductivity of lithium ions, and therefore it is possible to exhibit excellent lifespan characteristics and stability.

BEST MODE

Hereinafter, the present invention will be described in more detail.

An embodiment of the present invention relates to a method of preparing an amorphous sulfide exhibiting excellent ionic conductivity, the method including:
preparing a metal or an alloy including the metal;
gas-phase supplying a sulfur source to the surface of the metal or the alloy;
adjusting the temperature of sulfidation reaction between the sulfur source and the metal or the alloy to a temperature of room temperature to 300° C. to control the reaction rate; and
adjusting the density of an amorphous sulfide through control of the reaction rate.

The preparation method according to the invention is characterized by adjusting the reaction rate in performing sulfidation reaction by gas-phase supplying a sulfur source to the surface of a metal or an alloy to control the interfacial distance between metal atoms and chalcogen atoms, thereby preparing an amorphous sulfide with high ionic conductivity of lithium ions.

Figure 1:
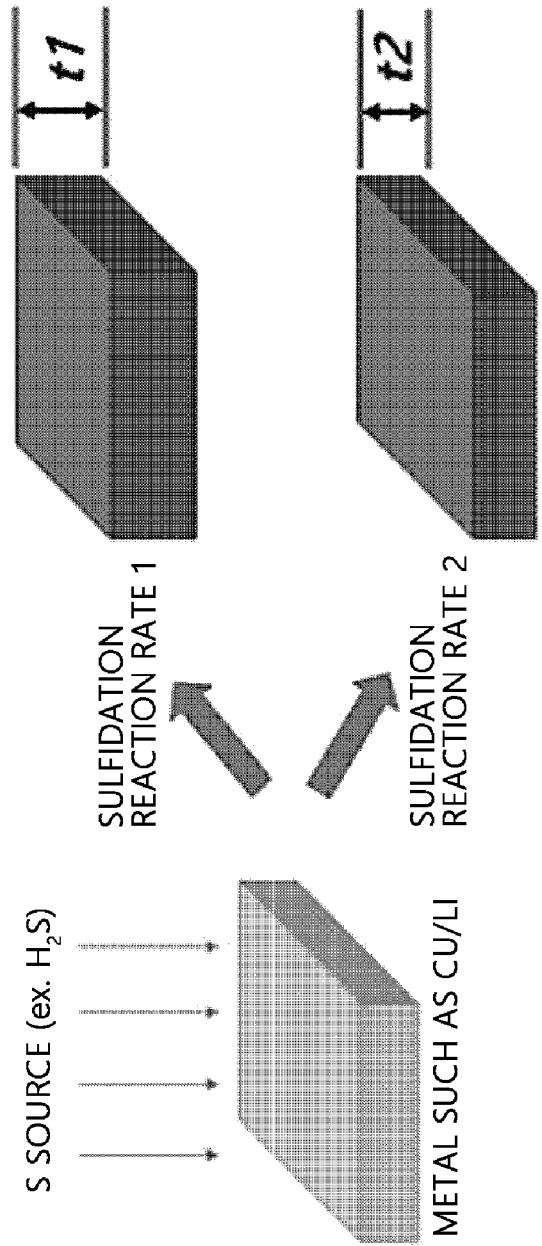
FIG. 1 is a view showing overall processes of a preparation method according to an embodiment of the present invention.

For example, FIG. 1 is a view showing overall processes of a preparation method according to an embodiment of the present invention. Specifically, FIG. 1 shows the difference in sulfidation reaction rate depending on adjustment of the reaction temperature and the flow rate (or the flow speed) of a sulfur source.

Referring to FIG. 1, sulfidation reaction rate 1 is greater (higher) than sulfidation reaction rate 2, and the average interfacial distance between metal atoms and chalcogen atoms in sulfidation reaction rate 1 is greater than the average interfacial distance between the metal atoms and the chalcogen atoms in sulfidation reaction rate 2. Therefore, it can be seen that the thickness t1 of the product at sulfidation reaction rate 1 is greater than the thickness t2 of the product at sulfidation reaction rate 2.

It can also be seen that the interfacial distance between the metal atoms and the chalcogen atoms (or the average interfacial distance between atoms of an amorphous sulfide) is greater and the density is lower at sulfidation reaction rate 1 than at sulfidation reaction rate 2.

For example, when the flow rate (or the flow speed) of the sulfur source is constant, the higher the reaction temperature, the higher the sulfidation reaction rate. At this time, the reaction temperature is preferably set to a range not exceeding 300° C., as described below.

Figure 3:
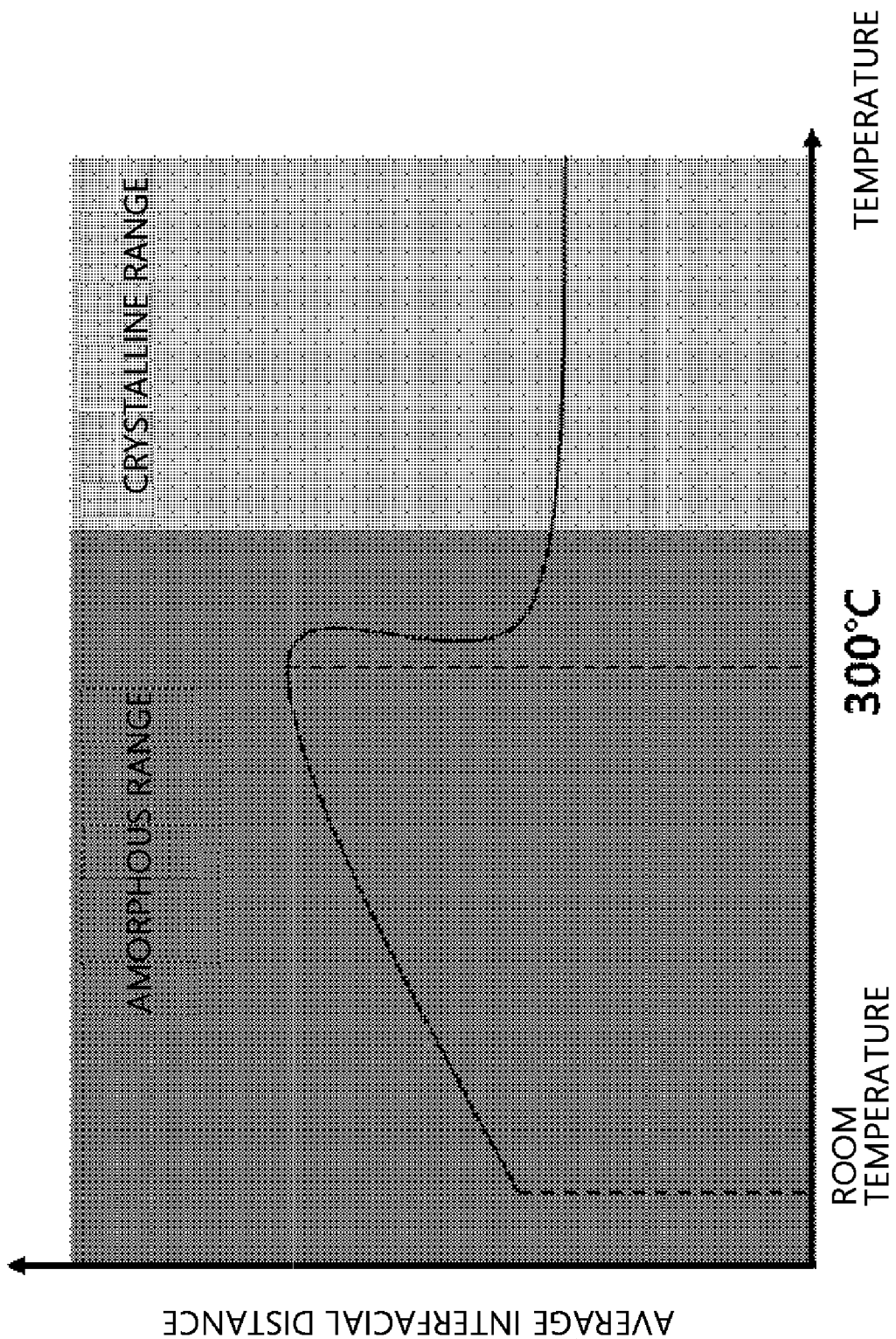
FIG. 3 is a graph showing the average interfacial distance between metal atoms and chalcogen atoms depending on temperature.

Referring to FIG. 3, the average interfacial distance between the metal atoms and the chalcogen atoms depending on temperature is shown. In addition, an amorphous temperature range and a crystalline temperature range may be distinguished based on the average interfacial distance.

If the reaction temperature exceeds the amorphous temperature range (e.g. room temperature to 300° C.), a reactant is crystallized at high temperatures, whereby it is not possible to control the average interfacial distance between the metal atoms and the chalcogen atoms. That is, if the reaction temperature exceeds the amorphous temperature range, it is impossible to prepare an amorphous sulfide with relatively low density.

According to the present invention, it is possible to maintain properties of the amorphous sulfide while relatively greatly securing the interfacial distance between the metal atoms and the chalcogen atoms through control of the reaction temperature The reaction temperature may be determined based on an element constituting a metal that reacts with the sulfur source or an alloy including the same.

Meanwhile, in the state in which the reaction temperature is constant, the higher the flow rate (or flow rate) of the sulfur source, the higher the sulfidation reaction rate.

Figure 2:
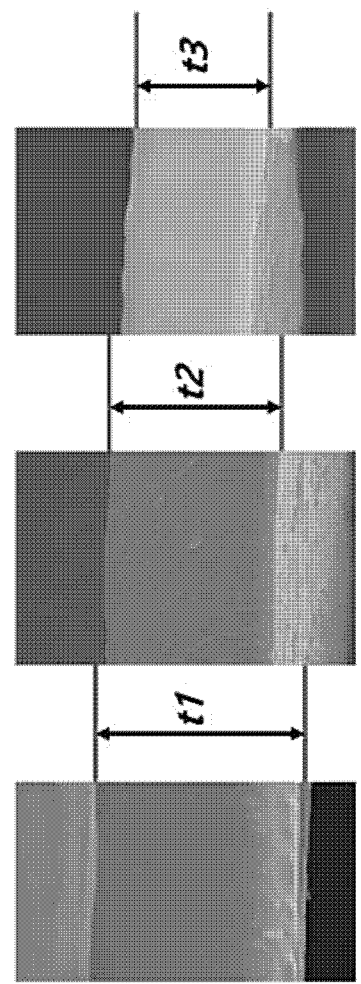
FIG. 2 is a view showing a sulfide synthesis example in which the density is controlled according to the sulfidation reaction rate of the present invention.

FIG. 2 is a sectional electron micrograph of an alloy reacted by changing the flow rate (or the flow speed) of the sulfur source that is supplied in the state in which the sulfidation reaction temperature is fixed at 300° C. It can be seen that the thickness of the product is changed from t1 to t3 depending on the flow rate (or the flow speed) of the sulfur source that is supplied. That is, referring to FIG. 2, it can be seen that the growth rate and density of the amorphous sulfide are controlled by controlling the reaction rate through adjustment of the flow rate (or the flow speed) of the sulfur source supplied for a certain time.

Referring to FIG. 2, the product in the case in which the flow rate (or the flow speed) of the sulfur source is reduced over a certain period of time from left to right is shown.

It can be seen that, when the reaction temperature is constant (e.g. about 300° C.), the higher the flow rate (or the flow speed) of the sulfur source, the greater the thickness of the amorphous sulfide. That is, the thickness t1 of the product when the flow rate (or the flow speed) of the sulfur source is relatively high is shown on the leftmost side, and the thickness t3 of the product when the flow rate (or the flow speed) of the sulfur source is relatively low is shown on the rightmost side.

As shown in FIG. 2, it can be seen that, when the reaction temperature is constant, the interfacial distance between the metal atoms and the sulfur atoms (or the average interfacial distance for an amorphous material) increases as the flow rate (or the flow speed) of the sulfur source is increased, whereby the thickness of the product is increased and the density is lowered.

The sulfide prepared by the preparation method according to the present invention is characterized in that the sulfide exhibits amorphous properties such that periodicity as a crystal is not observed to the extent that the sulfide does not have a peak in X-ray diffraction measurement, thereby exhibiting excellent ionic conductivity.

In the embodiment of the invention, chalcogen, which is an oxygen group element, means oxygen (O), sulfur (S), selenium (Se), tellurium (Te), and polonium (Po). In the sulfide produced in the present invention, it is preferable for a compound including Li, Ba, Cu, P, and Cl, to use sulfur as the chalcogen element. To this end, a sulfur source including sulfur is used.

Hydrogen sulfide ($H_2S$), sulfur vapor (S vapor), methyl mercaptan, or a compound including a thiol group may be used as the sulfur source; however, the present invention is not limited thereto.

The sulfur source may be supplied in a gaseous state, and may be continuously or pulse-like supplied.

In the embodiment of the invention, at least one selected from the group consisting of lithium (Li), copper (Cu), lanthanum (La), germanium (Ge), indium (In), and zirconium (Zr) may be used as the metal or the alloy including the same; however, the present invention is not limited thereto.

In the embodiment of the invention, reaction is preferably carried out at a temperature range of room temperature to 300° C. for 0.1 to 5 hours while the gas-phase sulfur source is continuously or pulse-like supplied into the same reactor. In the reactor, gas, such as hydrogen ($H_2$), argon (Ar), or nitrogen ($N_2$), may flow at a constant flow rate.

In the embodiment of the present invention, transition metal dichalcogenides (TMDs) have a two-dimensional structure. A two-dimensional material, such as transition metal dichalcogenides, has very strong bonding force due to covalent bond between atoms in one layer while layers are weakly bonded to each other, whereby the two-dimensional material exists in a stacked form. The transition metal dichalcogenides have a high electromobility of about 200 $cm^2/Vs$ and an on-off ratio of 108, which is excellent. In addition, the transition metal dichalcogenides are flexible, whereby the transition metal dichalcogenides are suitable for use as flexible thin-film transistors or channel layers necessary to realize a flexible display.

A deposition method of forming a uniform film having a large area on a substrate is used as a method of preparing the two-dimensional transition metal dichalcogenides, wherein chemical vapor deposition (CVD) or atomic layer deposition (ALD) is typically used. However, these methods may not be suitable for synthesis in bulk form.

In addition, the conventional chemical vapor deposition method and apparatus are mainly used to deposit a thin film having a thickness of 3 μm or less due to low deposition speed, and the concentration of a raw material in a chamber (reactor) must be significantly increased in order to deposit a thicker film. If a high-concentration raw material is injected into the chamber, however, the raw material spreads throughout the chamber and is deposited on the structure of the chamber, such as an inner wall, whereby contaminating particles are generated.

In the present invention, therefore, a method of directly forming an amorphous sulfide on the surface of a target metal and an alloy through gas-phase reaction of a sulfur precursor or a sulfur source material is used to synthesize transition metal dichalcogenides in bulk form.

In the embodiment of the invention, it is preferable for the temperature of sulfidation reaction of the sulfur source with the metal or the alloy to be room temperature to 300° C.

If the reaction temperature deviates from the above range (e.g. if the reaction temperature exceeds the above range), the reactant is crystallized at high temperatures, whereby it is not possible to control the average interfacial distance, side reaction with a current collector supporting the material or sample may occur, whereby the current collector may be damaged, and corrosion of process equipment or internal parts thereof may also occur at the process temperature.

In the embodiment of the invention, the rate of sulfidation reaction of the sulfur source with the metal or the alloy is adjustable by controlling the reaction temperature, whereby it is possible to adjust the density of the amorphous sulfide.

Furthermore, it is possible to adjust the interfacial distance between the metal atoms and the sulfur atoms (or the average interfacial distance for an amorphous material) by controlling the reaction rate. In the case of the amorphous material, the distance between atoms is not a fixed constant of the material and may have various values within a certain range. When the reaction rate is high, thermodynamic equilibrium may not be sufficient, leading to a less densified amorphous state. Consequently, it is possible to form an amorphous material having a lower density than a crystalline material of the same composition.

The present invention relates to a lithium-ion battery including a positive electrode, a negative electrode, and an electrolyte, wherein the electrolyte includes an amorphous sulfide prepared by the method described above.

According to the present invention, ionic conductivity of lithium ions is improved as the result of including the amorphous sulfide, whereby it is possible to manufacture a lithium-ion battery having excellent lifespan characteristics and stability.

Although the specific details of the present invention have been described in detail, a person having ordinary skill in the art to which the present invention pertains will appreciate that the detailed description thereof discloses only preferred embodiments of the present invention and thus does not limit the scope of the present invention. It will be possible for a person having ordinary skill in the art to which the present invention pertains to make various applications and modifications within the scope of the invention based on the above description.

Accordingly, the substantial scope of the present invention is defined by the appended claims and equivalents thereto.

The invention claimed is:

1. A method of preparing an amorphous sulfide exhibiting ionic conductivity, the method comprising:
   preparing a metal or an alloy comprising the metal;
   gas-phase supplying a sulfur source to a surface of the metal or the alloy; and
   controlling a reaction rate by adjusting a reaction temperature between the sulfur source and the metal or the alloy in a range of about 20° C. to 300° C. and by adjusting a flow rate of the gas-phase supplying of the sulfur source to the surface of the metal or the alloy to control an interfacial distance between sulfur atoms of the sulfur source and atoms of the metal or the alloy, such that a density of the amorphous sulfide is adjusted,
   wherein, as the reaction rate increases, the density of the amorphous sulfide decreases.

2. The method according to claim 1, wherein the sulfur source is hydrogen sulfide ($H_2S$), sulfur vapor (S vapor), methyl mercaptan, or a compound comprising a thiol group.

3. The method according to claim 1, wherein the metal or the alloy comprising the metal is at least one selected from a group consisting of lithium (Li), copper (Cu), lanthanum (La), germanium (Ge), indium (In), and zirconium (Zr).

4. A lithium-ion battery comprising:
   a positive electrode;
   a negative electrode; and
   an electrolyte,
   wherein the electrolyte comprises an amorphous compound prepared by the method according to claim 1.

5. A lithium-ion battery comprising:
   a positive electrode;
   a negative electrode; and
   an electrolyte,
   wherein the electrolyte comprises an amorphous compound prepared by the method according to claim 2.

6. A lithium-ion battery comprising:
   a positive electrode;
   a negative electrode; and
   an electrolyte,
   wherein the electrolyte comprises an amorphous compound prepared by the method according to claim 3.

* * * * *